United States Patent
Jeong et al.

(10) Patent No.: US 8,635,890 B2
(45) Date of Patent: Jan. 28, 2014

(54) PEDESTAL WASHING MACHINE

(75) Inventors: Seong Hae Jeong, Changwon-Si (KR); Seong Jin Jo, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 380 days.

(21) Appl. No.: 12/518,163

(22) PCT Filed: Dec. 31, 2007

(86) PCT No.: PCT/KR2007/007020
§ 371 (c)(1),
(2), (4) Date: Jun. 8, 2009

(87) PCT Pub. No.: WO2008/084934
PCT Pub. Date: Jul. 17, 2008

(65) Prior Publication Data
US 2010/0101282 A1  Apr. 29, 2010

(30) Foreign Application Priority Data

Jan. 10, 2007 (KR) .................. 10-2007-0002820
Jan. 10, 2007 (KR) .................. 10-2007-0002822
Jan. 10, 2007 (KR) .................. 10-2007-0002823

(51) Int. Cl.
*D06F 23/04* (2006.01)
*D06F 37/24* (2006.01)

(52) U.S. Cl.
USPC ............................................. 68/3 R; 68/23.3

(58) Field of Classification Search
USPC .................. 68/27, 3 R, 13 R, 23 R, 23.3, 26
See application file for complete search history.

(56) References Cited

U.S. PATENT DOCUMENTS

| | | | | |
|---|---|---|---|---|
| 2,225,407 A | * | 12/1940 | Bassett, Jr. | 68/12.21 |
| 2,570,529 A | * | 10/1951 | Dolan | 68/20 |
| 3,557,579 A | * | 1/1971 | Marshall | 68/23.5 |
| 3,815,258 A | * | 6/1974 | Beard, Jr. | 34/602 |
| 4,236,393 A | * | 12/1980 | Katzfey | 68/27 |
| 4,333,322 A | * | 6/1982 | Billings et al. | 68/23.2 |
| 4,481,786 A | * | 11/1984 | Bashark | 62/160 |
| 4,488,363 A | * | 12/1984 | Jackson et al. | 34/572 |
| 4,637,230 A | | 1/1987 | Roberts | |
| 5,211,038 A | | 5/1993 | Valent | |
| 5,315,847 A | * | 5/1994 | Takeda et al. | 68/12.02 |
| 5,470,142 A | * | 11/1995 | Sargeant et al. | 312/258 |

(Continued)

FOREIGN PATENT DOCUMENTS

| CN | 2101053 U | 4/1992 |
|---|---|---|
| CN | 1349012-1 | 5/2002 |

(Continued)

*Primary Examiner* — Joseph L Perrin
(74) *Attorney, Agent, or Firm* — Birch, Stewart, Kolasch & Birch, LLP

(57) ABSTRACT

A pedestal washing machine (100) capable of washing a small amount of laundry and also serving as a bedplate for supporting the other washing machine (200) is disclosed. The pedestal washing machine (100) includes a case (130) which has a volume and a height smaller than a volume and a height of a washer (200) to stably support the washer (200), an outer tub (140) installed in the case (130) to accommodate washing water, a rotating body (150) which is rotatably installed in the outer tub to shake laundry, and a driving device (190) which is installed in a space formed between the outer tub (140) and a corner of the case (130) to transfer a rotational force to the rotating body (150).

10 Claims, 5 Drawing Sheets

(56) References Cited

U.S. PATENT DOCUMENTS

| | | | |
|---|---|---|---|
| 5,711,170 A * | 1/1998 | Johnson | 68/3 R |
| 5,755,244 A * | 5/1998 | Sargeant et al. | 134/46 |
| 5,784,901 A * | 7/1998 | Yanase et al. | 68/27 |
| 5,904,163 A * | 5/1999 | Inoue et al. | 134/56 D |
| 6,447,081 B1 * | 9/2002 | Sargeant et al. | 312/228.1 |
| 6,618,887 B2 * | 9/2003 | Kim et al. | 8/158 |
| 7,904,983 B2 * | 3/2011 | Jun et al. | 8/158 |
| 2002/0042957 A1 * | 4/2002 | Kim et al. | 8/158 |
| 2003/0037809 A1 * | 2/2003 | Favaro | 134/58 D |
| 2004/0007256 A1 * | 1/2004 | Durazzani et al. | 134/57 D |
| 2006/0112737 A1 * | 6/2006 | Sunshine et al. | 68/3 R |
| 2006/0130535 A1 * | 6/2006 | Sunshine et al. | 68/3 R |
| 2006/0156765 A1 | 7/2006 | Sunshine et al. | |
| 2006/0174666 A1 * | 8/2006 | Je | 68/235 R |
| 2006/0260367 A1 * | 11/2006 | Byun | 68/20 |
| 2007/0101773 A1 * | 5/2007 | Park et al. | 68/5 C |
| 2007/0151300 A1 * | 7/2007 | Sunshine | 68/3 R |
| 2007/0151305 A1 * | 7/2007 | Kendall et al. | 68/13 R |
| 2007/0151309 A1 * | 7/2007 | Kendall et al. | 68/235 R |
| 2009/0193678 A1 * | 8/2009 | Latack et al. | 34/139 |

FOREIGN PATENT DOCUMENTS

| | | | | |
|---|---|---|---|---|
| EP | 1 655 408 A1 | | 5/2006 | |
| JP | 07229184 A | * | 8/1995 | E03C 1/08 |
| JP | 10-15275 A | | 1/1998 | |
| JP | 11137893 A | * | 5/1999 | D06F 39/08 |
| JP | 2006-95342 A | | 4/2006 | |
| KR | 20-1998-015918 U | | 6/1998 | |
| KR | 10-2004-0086059 A | | 10/2004 | |
| KR | 10-2006-0097210 A | | 9/2006 | |
| RU | 94011787 A | | 9/1995 | |
| RU | 2098531 C1 | | 12/1997 | |
| WO | WO 2004/097098 A1 | | 11/2004 | |
| WO | WO 2006062262 A1 | * | 6/2006 | D06F 58/02 |
| WO | WO 2006/126799 A2 | | 11/2006 | |

* cited by examiner

PEDESTAL WASHING MACHINE

TECHNICAL FIELD

The present invention relates to a pedestal washing machine serving as a bedplate of a washing machine or the like, and more particularly to a pedestal washing machine including a water supply device capable of simultaneously or selectively supplying water to a washing machine and the pedestal washing machine from an external water supply source.

BACKGROUND ART

Generally, a washing machine is an apparatus for washing, drying, or washing and drying the clothing and the like. Such a washing machine can perform only a washing function or a drying function or can perform both the washing and drying functions. Recently, a washing machine including a steam supplier, which has a refresh function of removing creases, odor, static electricity, etc. from the clothing and the like, has been widely used.

Meanwhile, conventional washing machines are classified into a front loading type washing machine and a top loading type washing machine according to the loading/unloading direction of the clothing. Also, the conventional washing machines are classified into a vertical axis type washing machine which rotates a pulsator or a washing tub and a horizontal axis type washing machine which rotates a drum according to the washing manner. The representative example of such a horizontal axis type washing machine is a drum washing machine or a drum drying machine.

The washing machines have a tendency to have a large size in order to meet the recent demand of users. That is, washing machines for home use also have a tendency to have a large outer size.

Generally, a single large-capacity washing machine is provided and used in each home. Accordingly, when the laundry is classified and washed according to the types of laundry, the washing machine is used several times. For example, when the laundry such as adult clothes and the laundry such as underclothes and baby clothes are separated and washed, the washing machine is used again to wash the laundry, such as underclothes and baby clothes, after washing the laundry such as adult clothes. Accordingly, a long washing time and a large amount of energy are consumed.

Further, it is undesirable in the energy-saving aspect to use a conventional large-sized washing machine when a small amount of clothing is washed. Since washing courses provided for a large-sized washing machine are generally expected to wash a large amount of laundry, a large amount of water is consumed. Further, since a large drum or inner tub should be rotated, a large amount of power is consumed. Further, since the washing courses are expected to wash a large amount of laundry, a washing time is relatively long.

Further, since the washing courses provided in the large-sized washing machine are expected to wash the general clothing, the large-sized washing machine may be improper for washing delicate clothes such as underclothes or baby clothes.

Also, in case of frequently washing a small amount of laundry, the large-sized washing machine is improper. The users collect the laundry for several days or for a longer period of time in order to wash the collected laundry at once.

It is undesirable in the aspect of cleanness to leave underclothes or baby clothes and the like for a long period of time. Further, when the laundry such as underclothes or baby clothes is left for a long period of time, the dirt becomes stuck to the clothes, thereby causing a problem that the laundry may not be washed cleanly.

Thus, a small-capacity small-sized washing machine is more necessary than the conventional large-sized washing machine. However, although the washing machines are even small-sized, it is undesirable in terms of space efficiency and beauty that two washing machines are provided in one home and installed side by side.

FIG. 1 illustrates a perspective view of a conventional washing machine.

As shown in FIG. 1, a conventional washing machine 1 includes a main body 10 forming an external appearance and a control panel 11 disposed on the front surface or top surface of the main body. The control panel 11 may include a controller for controlling the operation of the washing machine 1 serving as a laundry treating machine. Accordingly, the user can perform operations such as a washing operation or a drying operation by manipulating the control panel 11.

Meanwhile, the conventional washing machine 1 may further include a bedplate (pedestal) 20 for supporting the main body 10 on a floor. In this case, the main body 10 is installed on the bedplate 20.

The bedplate only serves to support the conventional washing machine or drying machine and could not be used for another purpose.

DISCLOSURE OF INVENTION

Technical Problem

An object of the present invention devised to solve the problem lies on a new type of pedestal washing machine capable of washing a small amount of laundry without operating a large-sized washing machine and also serving as a bedplate of a drying machine, a washing machine or the like.

Further, another object of the present invention is to provide a pedestal washing machine capable of ensuring a maximum washing space by sufficiently using a space in the washing machine.

Technical Solution

The object of the present invention can be achieved by providing a pedestal washing machine comprising: a case which has a volume and a height smaller than a volume and a height of a washer to stably support the washer; an outer tub installed in the case to accommodate washing water; a rotating body which is rotatably installed in the outer tub to shake laundry; and a driving device which is installed in a space formed between the outer tub and a corner of the case to transfer a rotational force to the rotating body.

Preferably, the driving device includes a belt which is connected to a rotation shaft of the rotating body and a motor which is installed at the case to rotate the belt.

Preferably, the driving device includes a belt which is connected to a rotation shaft of the rotating body and a motor which is installed at the outer tub to rotate the belt. In this case, preferably, the pedestal washing machine further includes a balance weight which is disposed on the outer tub at an opposite side to a portion where the motor is installed.

Preferably, the pedestal washing machine further includes a water supply valve which is disposed in the space formed between the outer tub and the corner of the case to selectively supply washing water into the outer tub from an external water supply source, and a water supply pipe which has at least a portion with a variable length and is connected to the water supply valve to supply washing water into the outer tub.

Preferably, the pedestal washing machine further includes a steam generator which is disposed in the space formed between the outer tub and the corner of the case to supply steam into the outer tub.

Preferably, the pedestal washing machine further includes a water drain valve for selectively discharging washing water and a water drain pump for compulsorily discharging washing water from the outer tub, which are disposed in the space formed between the outer tub and the corner of the case, and a water drain pipe which has at least a portion with a variable length and is connected to the water drain valve and the water drain pump to discharge washing water from the outer tub.

Preferably, the pedestal washing machine further includes a control panel which is disposed on a front surface of the case to input and display washing-related commands, and a controller which is disposed in the space formed between the outer tub and the corner of the case to control washing-related operations.

Preferably, the pedestal washing machine further includes a drawer which supports the outer tub and is extracted forward, and an upper frame which covers at least a portion of the top of the drawer, wherein the upper frame and the outer tub are armed as a single body.

In accordance with another aspect of the present invention, there is provided a pedestal washing machine comprising: a case which has a volume and a height smaller than a volume and a height of a washer to stably support the washer; an outer tub installed in the case to accommodate washing water; a control panel which is disposed on a front surface of the case to input and display washing-related commands; and a controller which is disposed in a space formed between the outer tub and a corner of the case to control washing-related operations.

Preferably, the pedestal washing machine further includes a water supply valve for selectively supplying washing water into the outer tub from an external water supply source and a water drain valve for selectively discharging washing water, which are disposed in the space formed between the outer tub and the corner of the case.

Preferably, the pedestal washing machine further includes a water supply pipe which has at least a portion with a variable length and is connected to the water supply valve to supply washing water into the outer tub, and a water drain pipe which has at least a portion with a variable length and is connected to the water drain valve to discharge washing water from the outer tub.

Advantageous Effects

The pedestal washing machine according to the present invention can support a washing machine disposed thereon and has a configuration appropriate for washing a small amount of laundry.

Further, it is possible to wash a small amount of laundry without using a large-sized washing machine, thereby reducing energy. Further, since the pedestal washing machine can support a large-sized washing machine or drying machine and the like, there is no restriction in the installation space.

Further, when the pedestal washing machine is used with a large-sized washing machine, it is possible to simultaneously perform washing operations for washing the laundry divided according to types of laundry.

Further, various devices installed in the pedestal washing machine are installed in a space between the outer tub and the corner of the case, thereby using a washing space as much as possible.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Hereinafter, preferred embodiments of the present invention, which are illustrated in the accompanying drawings, will be described in detail First, a pedestal washing machine according to the present invention will be described in detail with reference to FIGS. 2 to 6.

Figure 1:
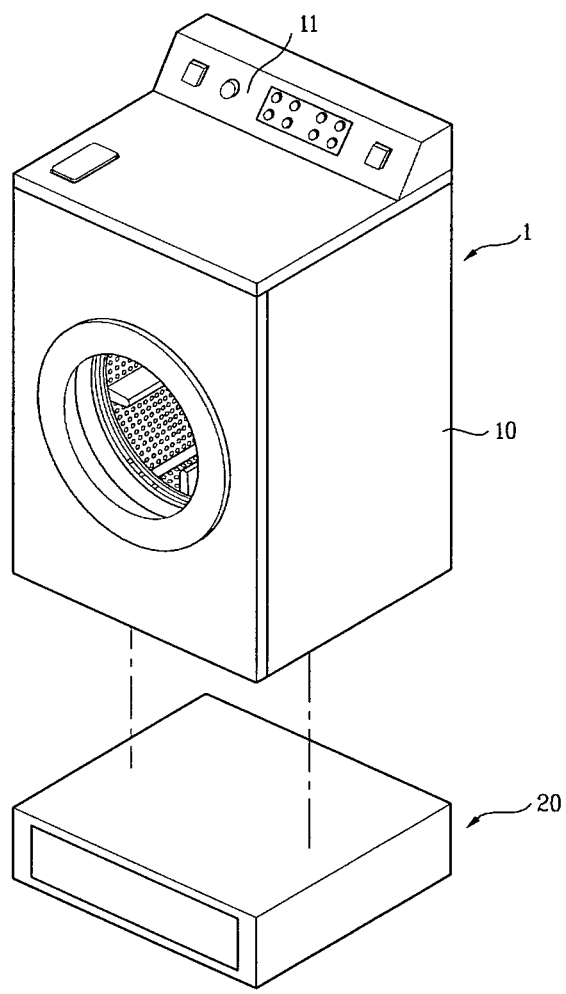
FIG. 1 illustrates a perspective view of a conventional washing machine.
Figure 2:
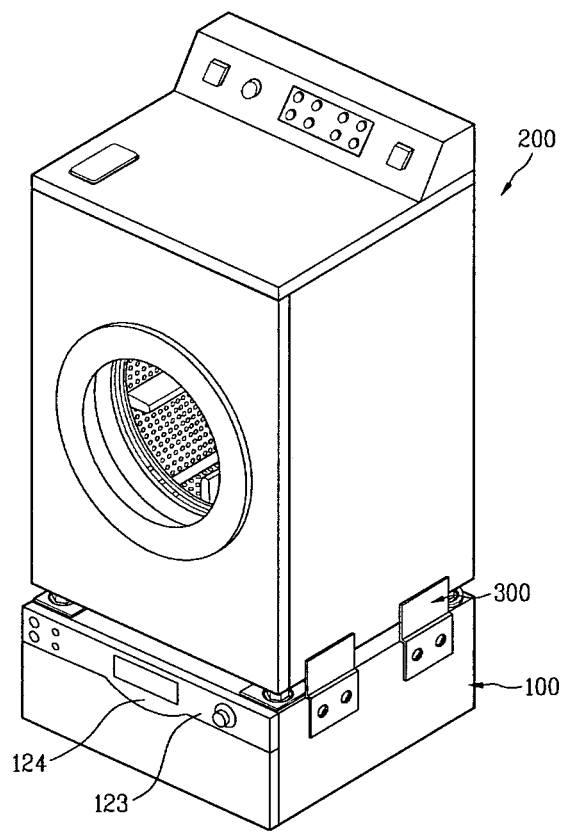
FIG. 2 illustrates a perspective view of a complex washing machine including a pedestal washing machine according to the present invention.

As shown in FIG. 2, a pedestal washing machine 100 serves as a bedplate of a drying machine or a washing machine 200.

Figure 3:
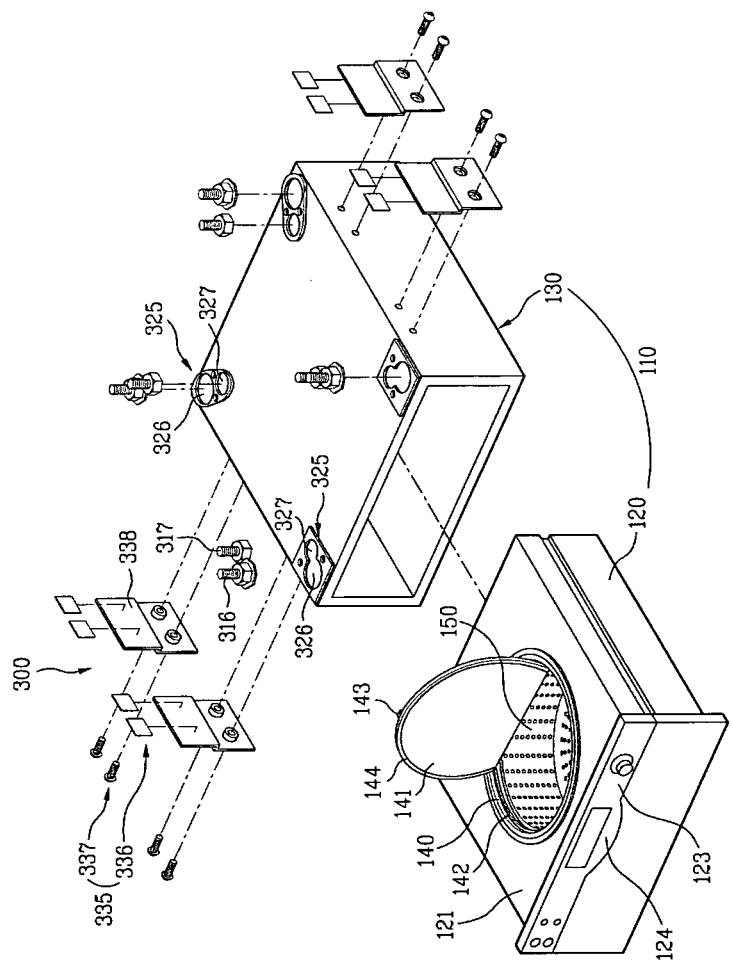
FIG. 3 illustrates an exploded perspective view of the pedestal washing machine according to the present invention.

Meanwhile, as shown in FIGS. 2 and 3, the pedestal washing machine 100 of this embodiment includes a case 110 having a space for accommodating the clothing therein, a coupler 300 which is disposed at an upper portion of the case 110 to couple the washing machine 200 with the case 110. In this case, the pedestal washing machine 100 supports the washing machine 200 on a floor.

Further, the pedestal washing machine 100 may include leg supporters 325 which are disposed at an upper portion of the pedestal washing machine 100 to support side surfaces of lower legs 316 and 317 of the washing machine 200.

Each of the leg supporters 325 includes a panel having a first seating hole 326 and a second seating hole 327 formed to safely seat the legs 316 and 317, respectively. The leg supporters 325 are fixed on the upper surface of the case 110 of the pedestal washing machine by means of screws.

The leg supporters 325 are fixed to respective corners of the top of the case 110 of the pedestal washing machine. In each of the leg supporters 325 fixed to the rear corners of the case 110, the first seating hole 326 and the second seating hole 327 are separated from each other. In accordance with this structure, it is possible to easily achieve the seating of the legs 316 and 317.

The coupler 300 includes coupling members 338 which are disposed on side surfaces and a lower portion of the washing machine 200 and also on side surfaces of the case 110 of the pedestal washing machine, and fixing members 335 which fix the coupling members 338 on both the side surfaces of the washing machine 200 and the side surfaces of the case 110 of the pedestal washing machine.

As shown in FIG. 3, the coupling members 338 may include at least two coupling members 338 which fix the side surfaces of the hexahedron-shaped case 110 of the pedestal washing machine and the hexahedron-shaped washing machine 200 to each other at a boundary thereof.

In addition to the above-described configuration, the coupling members 338 may further include a third coupling member (not shown) which fixes the case 110 of the pedestal washing machine and the rear surface of the washing machine 200 to each other.

In this case, the coupler 300 may be configured to cope with a variation in the height of the legs 316 and 317.

Each of the fixing members 335 includes a first fixing member 336 which fixes an upper portion of the associated coupling member 338 to a lower portion of the side surface of the washing machine 200 and a second fixing member 337 which fixes a lower portion of the coupling member 338 to an upper portion of the side surface of the pedestal washing machine.

At least one of the first and second fixing members 336 and 337 may include a member coated with an adhesive material on opposite surfaces thereof for example, a double-sided tape.

Alternatively, at least one of the first and second fixing members 336 and 337 may include a fastener such as a screw.

When screws are used as the fixing members, it is preferable that fastening holes are formed at the upper portion of the coupling member 338 to be spaced apart from each other by a certain distance.

Meanwhile, the coupler for coupling the washing machine 200 to the case 110 of the pedestal washing machine may have various configurations different from the above-described configuration.

Further, taking into consideration the stability and appearance design of the complex washing machine, it is preferable that at least one of the lateral and longitudinal widths of the case 110 of the pedestal washing machine is equal to or greater than the lateral width or the longitudinal width of the washing machine 200.

Hereinafter, the configuration of the pedestal washing machine according to the present invention will be described in detail with reference to FIGS. 3 to 6.

The pedestal washing machine 100 according to the present invention includes the case 110 which has a volume and a height smaller than a volume and a height of the washing machine 200 to stably support the washing machine 200; an outer tub 140 which is installed in the case 110 to accommodate washing water; a rotating body 150 which is rotatably installed in the outer tub 140 to shake the laundry; and a motor 190 which is installed in a space formed between the outer tub 140 and a corner side of the case 110 to transfer a rotational free to the rotating body 150.

The case 110 includes a case main body 130 and a drawer 120. The drawer 120 can be forwardly extracted from and retracted into the case main body 130. Further, the case main body 130 has a proper size to be mounted with the conventional washing machine thereon and a strong structure.

The outer tub 140 is fixedly installed on the drawer 120. An upper frame 121 is disposed on the drawer 120 to cover an upper portion of the drawer 120. The outer tub 140 and the upper frame 121 are formed as a single body.

An outer tub door 141 is installed at an upper opening of the outer tub 140. A door frame 142 is protrudingly formed on an inner wall surface of the outer tub 140 in a circumferential direction. A door sealing member 144 is installed on the outer tub door 141. Accordingly, when the outer tub door 141 is closed, the door sealing member 144 is contacted with the door frame 142 to seal an upper portion of the outer tub 140.

Further, a hook 143 is installed on the outer tub door 141. The hook 143 is inserted into a hook groove (not shown) formed on the inner wall surface of the outer tub 140. The hook 143 is supported by a spring (not shown) installed therein. Further, since an end of the hook 143 is gently formed, the hook 143 can be separated from or inserted into the hook groove by applying an appropriate force thereto when the door 141 is opened or closed.

The hook device may have a shape commonly used in conventional devices. Alternatively, a locking means may be provided instead of the hook device.

Since the pedestal washing machine 100 has a relatively low height, washing water may spring out of the outer tub 140. However, this phenomenon is prevented by the outer tub door 141.

The rotating body 150 is disposed in the outer tub 140. According to the embodiment of the present invention, the rotating body is an inner tub. The rotating body 150 includes a number of through holes for the inlet and outlet of washing water. In another embodiment, the rotating body 150 may be a pulsator.

Further, the pedestal washing machine 100 includes a driving device for transferring a rotational bite to the rotating body 150. The driving device includes the motor 190, a driving pulley 191 connected to a rotation shaft of the motor 190, a driven pulley 192 connected to a rotation shaft of the rotating body 150, and a belt 193 which connects the driving pulley 191 to the driven pulley 192. That is, when the motor 190 is rotated, the driven pulley 192 is rotated through the driving pulley 191 and the belt 193, whereby the rotating body 150 is rotated and operated.

Figure 4:
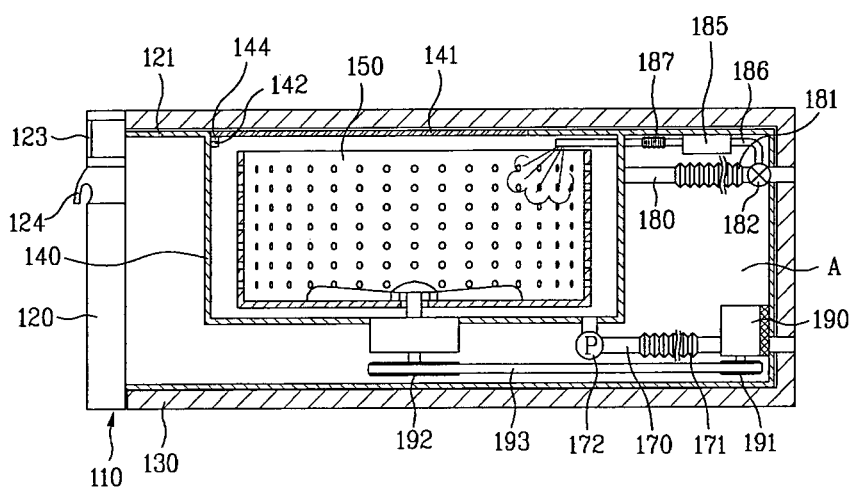
FIG. 4 illustrates a cross-sectional view of a pedestal washing machine according to a preferred embodiment of the present invention.
Figure 6:
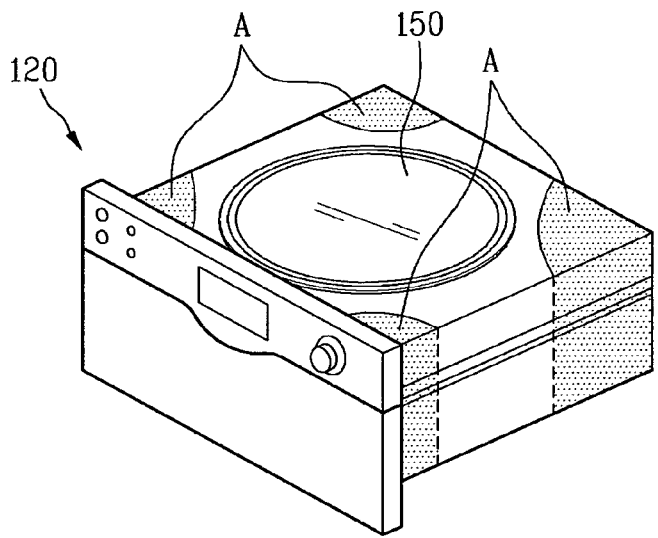
FIG. 6 illustrates a perspective view of a drawer of the pedestal washing machine.

As shown in FIGS. 4 and 6, the motor 190 may be fixed to one side corner of the drawer 120. Specifically, the motor 190 is disposed to be fixed to the drawer 120 in a space A formed between the outer tub 140 and a lower corner of the drawer 120.

Figure 5:
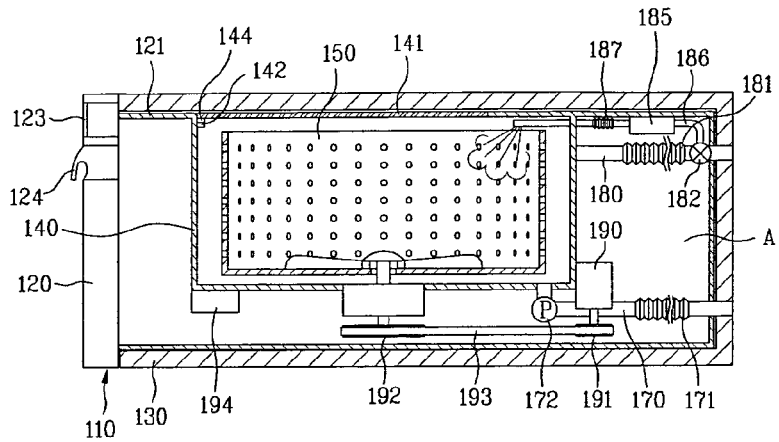
FIG. 5 illustrates a cross-sectional view of a pedestal washing machine according to another embodiment of the present invention.

In another embodiment, as shown in FIGS. 5 and 6, the motor 190 may be fixed on an outer peripheral surface of the outer tub 140. Specifically, the motor 190 is disposed in the space A formed between the outer tub 140 and the corner of the drawer 120 to be fixed on the outer peripheral surface of the outer tub 140.

Meanwhile, when the motor 190 is fixed on the tub 140 and operated, preferably, a balance weight 194 is disposed on the outer tub 140 at the opposite side to a portion where the motor 190 is installed to compensate eccentricity due to a weight of the motor 190 at the opposite side.

Further, a water drain pipe 170 for discharging water is connected to a lower portion of the outer tub 140. One end of the water drain pipe 170 is fixed to the case main body 130 to communicate with the outside. The other end of the water drain pipe 170 is connected to the lower portion of the outer tub 140 to communicate therewith. A water drain pump 172 is connected to and installed on the water drain pipe 170 to compulsorily discharge washing water from the outer tub 140.

Further, a portion of the water drain pipe 170 is formed of a water drain bellows tube 171 which is extensible and contractible in a longitudinal direction. Accordingly, when the drawer 120 is extracted forward, the water drain bellows tube 171 is extended.

A telescopic structure may be used instead of the bellows tube.

A water supply pipe 180 for supplying water is connected to an upper portion of the outer tub 140. The other end of the water supply pipe 180 is connected with a water supply valve 182. The water supply pipe 180 also includes a water supply bellows tube 181.

Further, a steam generator 185 is installed to supply steam into the rotating body 150. The steam generator 185 is supplied with water from a steam water supply pipe 186 connected to the water supply valve 182. The steam is supplied into the rotating body 150 through a steam pipe 187.

The steam pipe 187 has a structure with a variable length such as a bellows tube in the same manner as the water supply pipe 180. A steam jetting opening of the steam pipe 187 is disposed at an upper portion of the rotating body 150 to supply steam into the rotating body 150.

The steam generator 185 may be formed to have the same structure as a steam generator used in a conventional washing machine.

Meanwhile, a control panel 123 is installed on a front surface of the drawer 120. The control panel 123 is an input unit to which commands related washing such as washing courses are inputted, and includes various buttons and a knob. The control panel 123 further includes an LCD window and an LED lamp serving as a display unit for displaying washing information.

The control panel 123 further includes a controller (not shown) having a microcomputer to control the operation of the pedestal washing machine.

Further, the control panel 123 may additionally include a locking device (not shown) to maintain the drawer 120 while being retracted into the case main body 130. It is preferable that the locking device is an electronic locking device which is controlled by the controller.

In a washing state where the rotating body 150 is rotated, the locking device is controlled such that the drawer 120 is not extracted. If the drawer 120 is extracted when the rotating body 150 is rotated, large vibration may be generated. Accordingly, the controller controls the locking device such that the drawer is not extracted in the state where the rotating body 150 is rotated. The electronic locking device also may employ a conventionally used device in home appliances. In this case, it is possible to detect a rotation state of the rotating body 150 through a rotation state of the motor 190.

Further, the user may intend to extract the drawer 120 when a washing operation is in progress. In this case, preferably, the controller releases the locking device after stopping the operation of the rotating body 150. In this case, the controller may display a time point capable of extracting the drawer 120 after stopping the operation of the rotating body 150 on the display unit.

A 'pause' button may be disposed on the control panel to determine a case where the user intends to extract the drawer 120. Alternatively, it is possible to determine a case where the user intends to extract the drawer 120 using a sensor such as a force sensor. For example, when the user applies a free to extract the drawer 120, the force is sensed by the force sensor and the controller compares the sensed result with a reference value. Accordingly, if the sensed result is greater than the reference value, it is determined that the user intends to extract the drawer 120.

The force sensor may be installed in a locking groove which receives a lock of the locking device in the case main body 130. Accordingly, when the user pulls the drawer to extract the drawer, the force sensor installed in the locking groove receives a force by the lock, and an associated signal is transmitted to the controller. Then, the controller compares the result sensed by the force sensor with a reference value, and the controller releases the locking device after stopping the operation of the rotating body 150.

Figure 7:
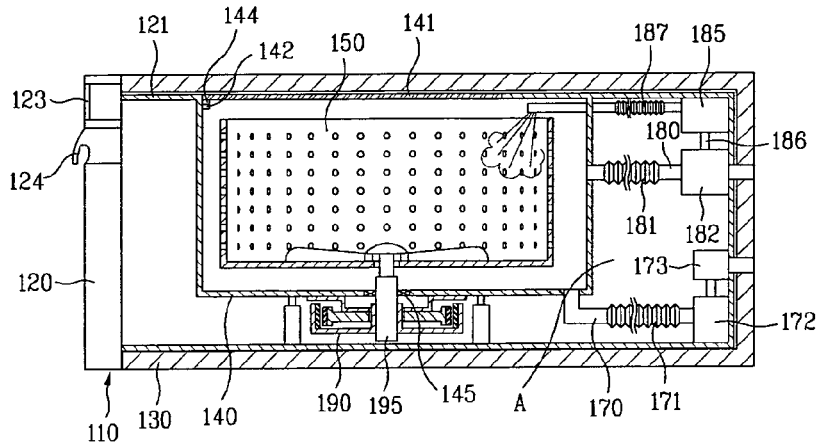
FIG. 7 illustrates a cross-sectional view of a pedestal washing machine according to yet another embodiment of the present invention.

FIG. 7 illustrates a cross-sectional view of a pedestal washing machine according to yet another embodiment of the present invention.

In the pedestal washing machine according to yet another embodiment of the present invention, the motor 190 is fixedly installed on the bottom surface of the outer tub 140. The motor 190 is an outer rotor type motor having a stator which is fixedly installed on the bottom surface of the outer tub 140. Further, a rotation shaft 195 of the rotor passes through the bottom of the outer tub 140 to be directly connected to the bottom of the inner tub 150. A bearing 145 may be installed on the bottom of the outer tub 140 to support the rotation shaft 195.

Further, the motor 190 has concentrated windings and a diameter greater than its height.

Further, the water drain pipe 170 for discharging water is connected to the lower portion of the outer tub 140. One end of the water drain pipe 170 is fixed to the case main body 130 to communicate with the outside. The other end of the water drain pipe 170 is connected to the lower portion of the outer tub 140 to communicate therewith. A water drain valve 173 for selectively discharging washing water and the water drain pump 172 for compulsorily discharging washing water are connected to and installed on the water drain pipe 170.

Further, a portion of the water drain pipe 170 is formed of the water drain bellows tube 171 which is extensible and contractible in a longitudinal direction. Accordingly, when the drawer 120 is extracted forward, the water drain bellows tube 171 is extended. A telescopic structure may be used instead of the bellows tube.

In this case, the water drain valve 173 and the water drain pump 172 are disposed in the space A formed between the outer tub 140 and the corner of the case 110. Particularly, it is preferable that the water drain valve 173 and the water drain pump 172 are disposed at the lower corner side of the case 110.

The water supply pipe 180 for supplying water is connected to the upper portion of the outer tub 140. The other end of the water supply pipe 180 is connected with the water supply valve 182. The water supply pipe 180 also includes the water supply bellows tube 181.

Further, the water supply valve 182 is disposed in the space A formed between the outer tub 140 and the corner of the case 110. In this case, it is preferable that the water supply valve 182 is disposed at the upper corner side of the case 110.

Further, the steam generator 185 is installed to supply steam into the outer tub 140. The steam generator 185 is supplied with water from the steam water supply pipe 186 connected to the water supply valve 182. The steam is supplied into the outer tub 140 through the steam pipe 187. In the same way, the steam pipe 187 has a structure with a variable length such as a bellows tube. Preferably, the steam jetting opening of the steam pipe 187 is disposed at the upper portion of the inner tub 150 to supply steam into the inner tub 150.

The steam generator 185 may be formed to have the same structure as a steam generator used in a conventional washing machine.

In the same manner as the water supply valve 182, the steam generator 185 is also disposed in the space A formed between the upper corner side in the drawer 120 and the outer tub 140. Accordingly, it is possible to increase a washing space and improve space efficiency by installing various devices in the space A.

Figure 8:
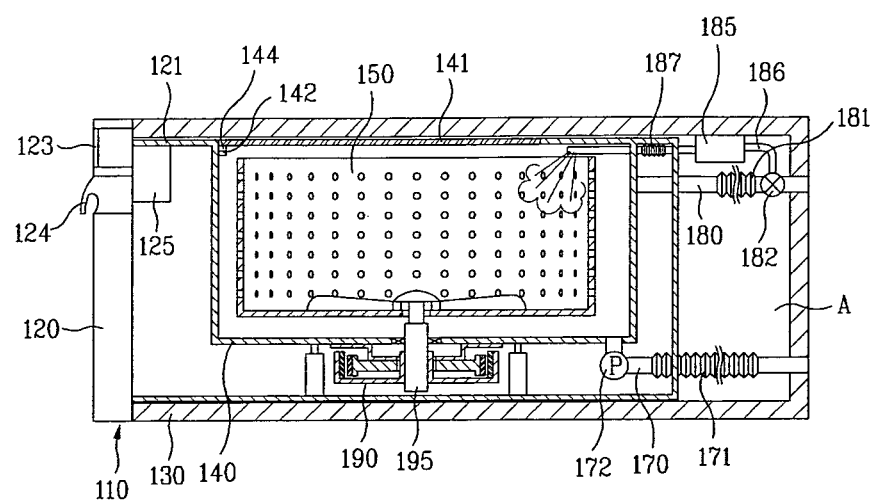
FIG. 8 illustrates a cross-sectional view of a pedestal washing machine according to yet another embodiment of the present invention.

FIG. 8 illustrates a cross-sectional view of a pedestal washing machine according to yet another embodiment of the present invention.

As shown in FIG. 8, the control panel 123 is installed on the front surface of the drawer 120. The control panel 123 is an input unit to which commands related washing such as washing courses are inputted, and includes various buttons and a knob. The control panel 123 further includes an LCD window and an LED lamp serving as a display unit for displaying washing information.

Further, preferably, a controller 125 for controlling the motor 190, the water supply valve 182, the water drain pump 172 and the like is disposed at a position corresponding to the control panel 123. However, since the control panel 123 has a specified thickness, when there is a restriction in the space between a central portion of the drawer 120 and the outer tub 140, it is preferable that the controller 125 is disposed in the space A formed between the outer tub 140 and the corner of the case 110.

As described above, the driving device, the water supply and water drain valves, the controller and the like are installed in the space A formed between the outer tub 140 and the corner of the case 110. Accordingly, it is possible to ensure a maximum washing space by sufficiently using an inner space of the pedestal washing machine.

Only some of the driving device, the water supply and water drain valves, the controller and the like may be installed in the space A formed between the outer tub 140 and the corner of the case 110. All of the driving device, the water supply and water drain valves and the controller may be installed in the space A formed between the outer tub 140 and the corner of the case 110.

It will be apparent to those skilled in the art that various modifications and variations can be male in the present invention without departing from the spirit or scope of the invention. Thus, it is intended that the present invention cover the modifications and variations of this invention provided they come within the scope of the appended claims and their equivalents.

Industrial Applicability

The pedestal washing machine according to the present invention can support a washing machine disposed thereon and has a configuration appropriate for washing a small amount of laundry.

Further, it is possible to wash a small amount of laundry without using a large-sized washing machine, thereby reducing energy. Further, since the pedestal washing machine can support a large-sized washing machine or drying machine and the like, there is no restriction in the installation space.

Further, when the pedestal washing machine is used with a large-sized washing machine, it is possible to simultaneously perform washing operations for washing the laundry divided according to types of laundry.

Further, various devices installed in the pedestal washing machine are disposed in a space between the outer tub and the corner of the case. Thus, it is possible to improve space efficiency by using a device installation space as a washing space.

The invention claimed is:

1. A pedestal washing machine comprising:

a case foaming an appearance of the pedestal washing machine and forming a reception space having an opened front surface;

a drawer configured to be forwardly extracted from and retracted into the front surface of the case;

an outer tub installed in the drawer to accommodate washing water, the outer tub being exposed as the drawer is forwardly extracted from the front surface of the case;

a rotating body which is rotatably installed in the outer tub to shake laundry, the rotating body having a vertically oriented rotation shaft;

a driving device which is disposed in one space foimed between an outer circumferential surface of the outer tub and a vertical corner of the drawer to transfer a rotational force to the rotating body;

a water supply pipe which has one end connected to the outer tub through the drawer and the other end passing through the case and extending to the outside of the case and has at least a portion with a variable length to supply washing water into the outer tub and extends and contracts according to movement of the drawer; and a water drain pipe which has one end connected to the outer tub through the drawer and the other end passing through the case and extending to the outside of the case and has at least a portion with a variable length to discharge washing water from the outer tub and extends and contracts according to movement of the drawer, wherein the driving device is installed on the outer circumferential surface of the outer tub.

2. The pedestal washing machine according to claim 1, wherein the driving device includes a belt which is connected to the rotation shaft of the rotating body and a motor which is installed at the case to rotate the belt.

3. The pedestal washing machine according to claim 1, wherein the driving device includes a belt which is connected to the rotation shaft of the rotating body and a motor which is installed at the outer tub to rotate the belt.

4. The pedestal washing machine according to claim 3, further comprising a balance weight which is disposed on the outer tub at an opposite side to a portion where the motor is installed.

5. The pedestal washing machine according to claim 1, further comprising a water supply valve which is disposed in the space formed between the outer tub and the corner of the case to selectively supply washing water into the outer tub from an external water supply source.

6. The pedestal washing machine according to claim 5, wherein the water supply pipe is connected to the water supply valve to supply washing water into the outer tub.

7. The pedestal washing machine according to claim 1, further comprising a steam generator which is disposed in the space formed between the outer tub and the corner of the case to supply steam into the outer tub.

8. The pedestal washing machine according to claim 1, further comprising a water drain valve for selectively discharging washing water and a water drain pump for compulsorily discharging washing water from the outer tub, which are disposed in the space formed between the outer tub and the corner of the case.

9. The pedestal washing machine according to claim 8, wherein the water drain pipe is connected to the water drain valve and the water drain pump to discharge washing water from the outer tub.

10. The pedestal washing machine according to claim 1, further comprising an upper frame which covers at least a portion of the top of the drawer, wherein the upper frame and the outer tub are formed as a single body.

* * * * *